Figure 1:
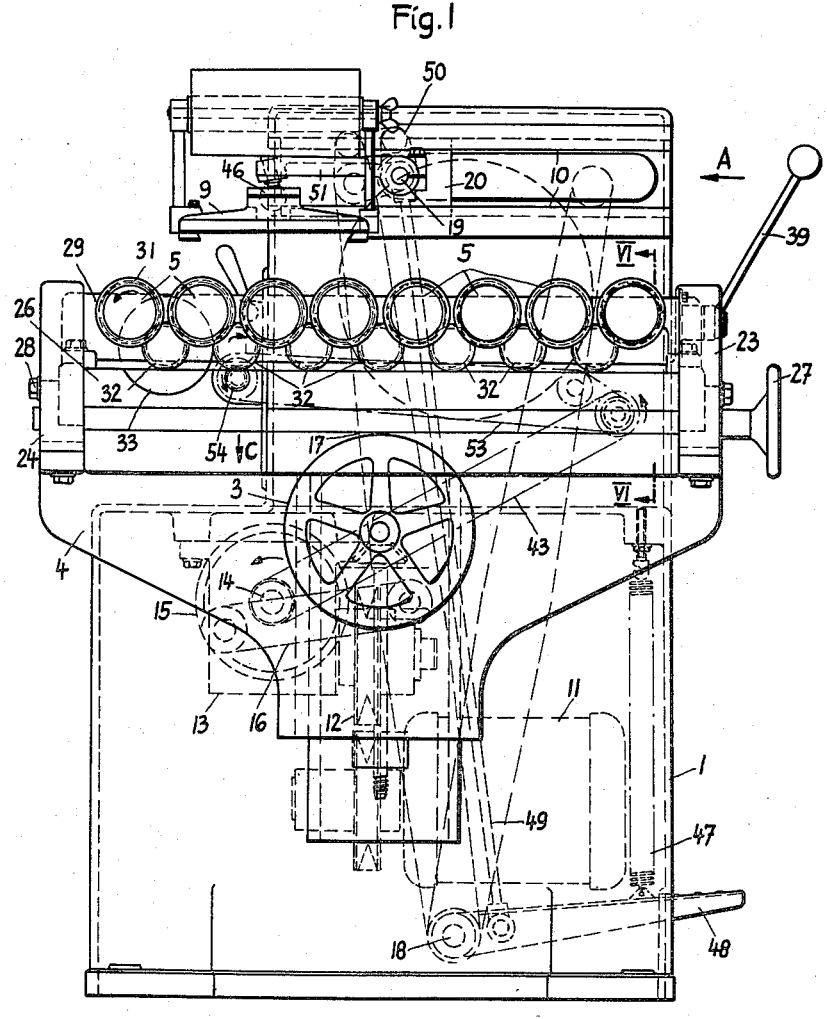

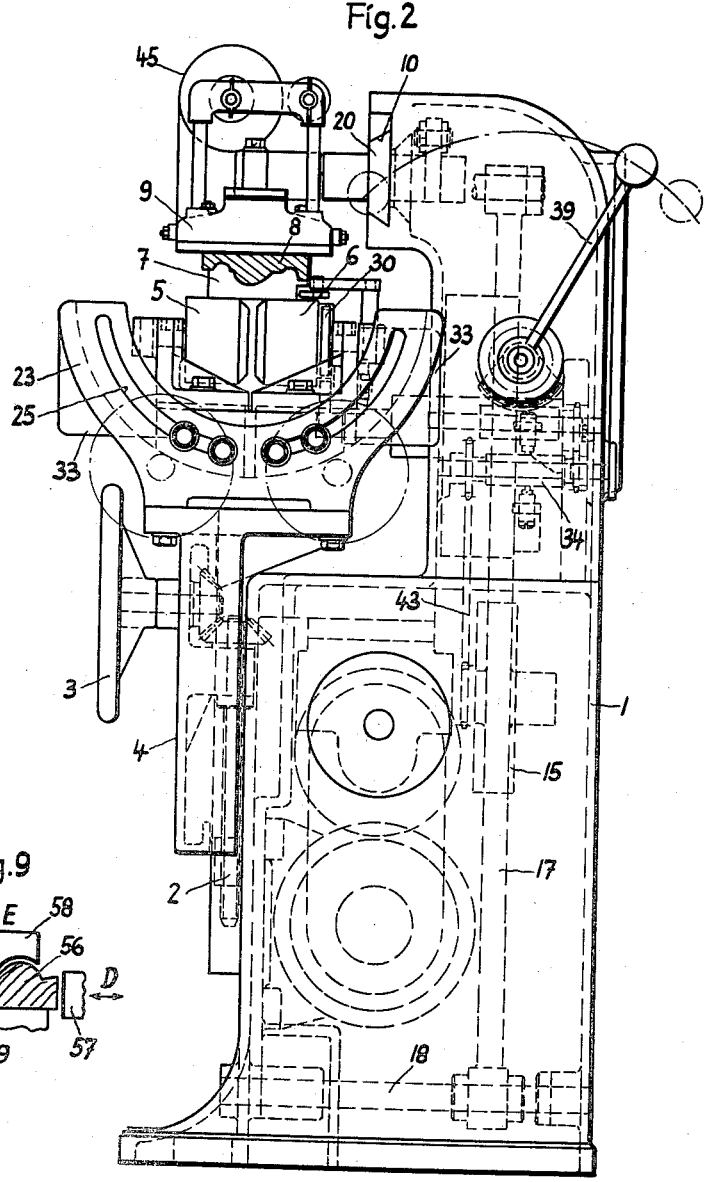

April 12, 1960      R. SCHUSTER      2,932,132
MACHINE FOR THE SURFACE TREATMENT OF WORKPIECES
Filed May 9, 1957      5 Sheets-Sheet 3
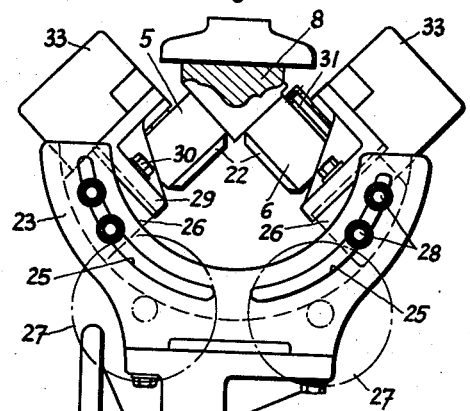
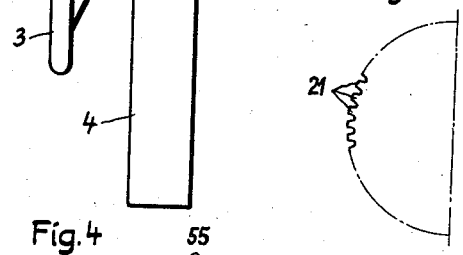
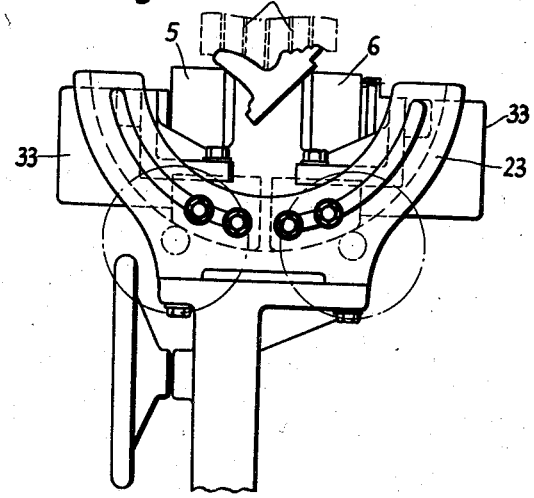
INVENTOR.
ROMAN SCHUSTER April 12, 1960 R. SCHUSTER 2,932,132
MACHINE FOR THE SURFACE TREATMENT OF WORKPIECES
Filed May 9, 1957 5 Sheets-Sheet 4
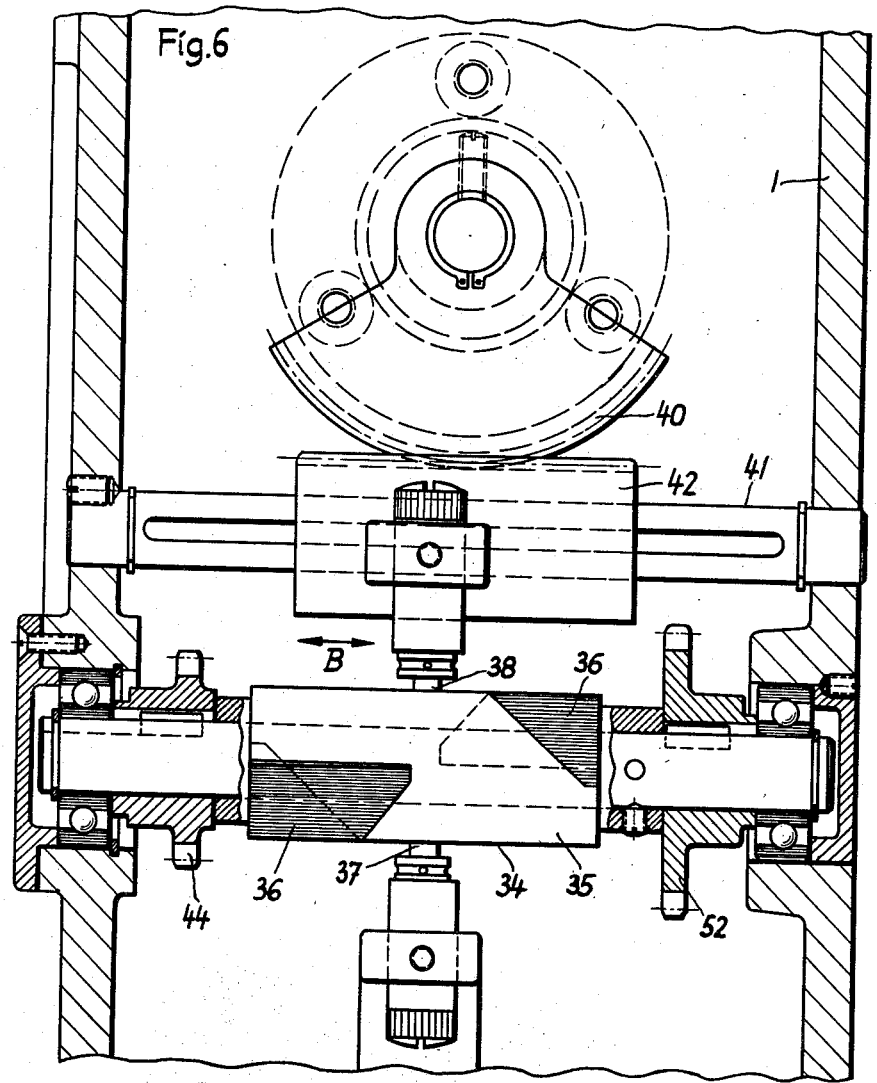
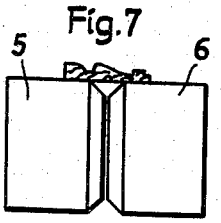
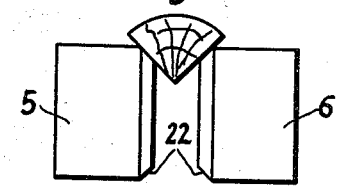
INVENTOR.
ROMAN SCHUSTER
BY

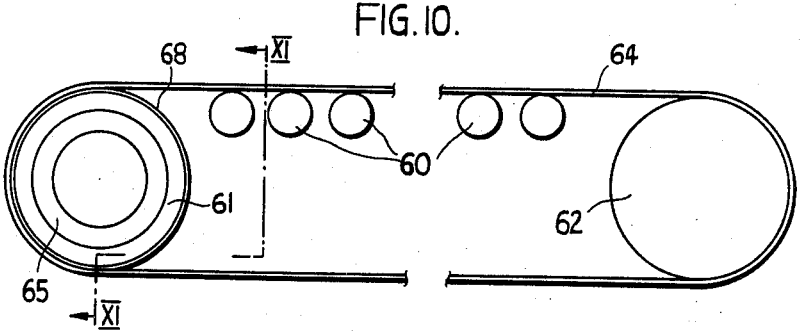
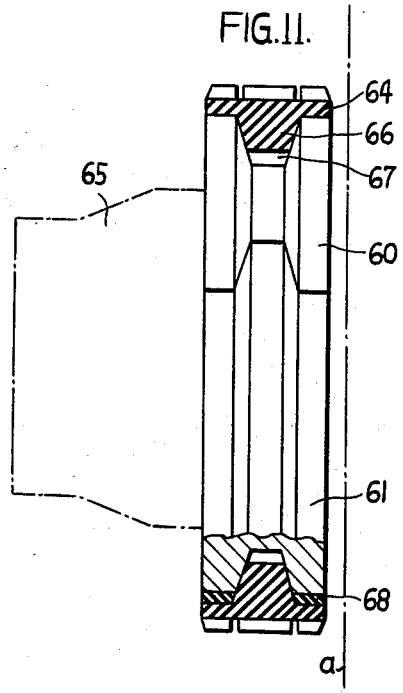
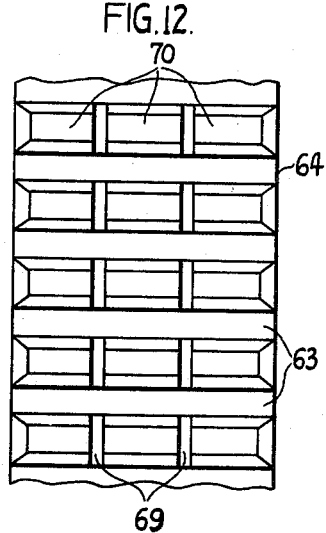

United States Patent Office

2,932,132
Patented Apr. 12, 1960

2,932,132

MACHINE FOR THE SURFACE TREATMENT OF WORKPIECES

Roman Schuster, Senden (Iller), Germany

Application May 9, 1957, Serial No. 668,589

Claims priority, application Germany May 9, 1956

17 Claims. (Cl. 51—59)

The invention relates to a machine for surface treatment of wood or the like, and more particularly to a machine for finishing surfaces with the aid of flexible coated abrasives, of profiled workpieces of wood using a reciprocating tool which is pressed down upon the workpiece. Having regard to the difficulties which arise in these circumstances, and more particularly to the extraordinary wide variety of shapes of profiled wood strips, it was previously not possible to finish all the required profiles on one and the same machine, so that this surface treatment usually had to be carried out by hand. Mechanical finishing is made considerably more difficult inter alia by the fact that the surfaces of profiled wood strips produced with the aid of machines provided with rotary cutters are not uniform at all parts thereof (due to variations in the structure of the wood), so that at cerain parts a more prolonged finishing is necessary than at other parts. It therefore is an object of this invention to provide means affording the construction of a machine which, while being simple to operate, permits finishing of profiled strips of any shape reliably and economically by the use of a reciprocating finishing tool.

It is another object of the invention to provide means contributing to a high degree to the efficiency of finishing machines for workpieces, especially profiled wood strips.

In the machine according to the invention, the required feed is imparted to the workpiece, which is normally held fixed against displacement, by temporarily releasing it whereupon it is carried along by the tool friction.

Further details of the invention and other advantages thereof are explained by reference to the constructional embodiments illustrated in the accompanying drawings, in which:

Fig. 1 is a front elevational view of a finishing machine for profiled strips and made in accordance with the invention, Fig. 2 is a side elevational view of the machine as seen in the direction of the arrow A in Fig. 1, Figs. 3 and 4 are corresponding views of a supporting bed in different positions, Fig. 5 illustrates the profile of a supporting roller, Fig. 6 is a cross-sectional view taken on the line VI—VI in Fig. 1, Figs. 7 and 8 illustrate the positions of the supporting rollers when supporting strips of two different profiles respectively, Fig. 9 is a fragmentary view illustrating a further constructional embodiment, Fig. 10 is a side elevational view of a supporting bed embodying an endless belt, Fig. 11 is a cross sectional view taken on the line XI—XI in Fig. 10, and Fig. 12 is a fragmentary plan view of part of the belt.

Referring more particularly to the drawings, there is disclosed in Fig. 1 a supporting stand 1 for the machine which accommodates the driving mechanism. On the front of this supporting stand 1 is arranged a slide 4 which is vertically adjustable by means of a lead screw 2, see Fig. 2, and a hand wheel 3. This slide 4 carries a bed, constituted by rollers 5 and 6, for supporting a profiled strip 7 to be finished. A finishing block 8 which is fixed to a carrier 9 serves to effectuate the finishing operation for strip 7. This carrier 9 is slidably mounted in a dovetail groove 10 in the stand 1. The drive for this finishing block is obtained from an electric motor 11 which drives a worm gear 13 via a continuously variable gear 12, see Fig. 1. On the output shaft 14 of this worm gear is keyed a crank disc 15 which imparts movement via a connecting rod 16 to a lever 17 which is pivoted at 18. This lever 17 is connected at 19 with a slide 20 which supports the carrier 9 and is likewise arranged for reciprocating movement in the dovetail groove 10. The rate of reciprocation of the finishing tool carrier 9 is adjustable by means of the continuously variable gear 12.

The machine described above operates as follows. The profiled strip 7 to be finished is placed on the supporting rollers 5, 6 and during the finishing operation, that is to say while the finishing block 8 is reciprocating, is held by the rollers 5, 6. For this purpose the rollers must be held stationary during the finishing operation and must have supporting surfaces which are capable of gripping to such an extent that the frictional resistance between the rollers 5, 6 and the strip is greater than the frictional resistance between the finishing block 8 and the strip. Consequently, the supporting rollers 5 and 6 are advantageously provided with a resilient coating of india rubber or the like which is preferably transversely grooved as shown in Fig. 5, so that there are rubber teeth 21 which ensure a very good adhesion between the wood and the rollers. In order to enable certain special profiles (see Figs. 4 and 8) to be mounted on them, the supporting rollers 5 and 6 are conically bevelled on their proximate ends at 22.

As shown in the drawings, two supporting beds or two rows of rollers 5 and 6 are arranged side-by-side, in such a manner that not only can the distance between these rows of rollers be varied (see Figs. 2 and 4), but the rollers can also be adjusted with respect to one another to any desired angle as shown in Fig. 3. Due to this multilateral adjustability, it is possible to finish profiles of the most widely varied form and size. In order to provide for this adjustability of the supporting beds, there are provided in both end walls 23 and 24 of the slide 4 semi-circular guide slots 25 in which are adjustably mounted two bars 26 which extend in the longitudinal direction of the machine. These bars may be moved to and fro in the guide slots 25 by means of toothed racks actuated by turning hand wheels 27, and may be fixed in position by means of clamping screws 28.

As is clear from the drawings, angle bars 29 are transversely slidable on the adjustable bars 26 and can be secured in position by clamping screws 30. These angle bars 29 carry the spindles of the supporting rollers 5 and 6.

As shown in Figs. 1 and 2, gears 31 are fixed to the supporting rollers. Meshing with these gears 31 are intermediate gears 32, so that all the supporting rollers are drivably connected together by these gears. In order to be able temporarily to hold stationary the supporting bed which is composed by these rollers, there are provided two magnetic clutches 33 each of which is arranged on the shaft of one of the intermediate gears 32. As long as the windings of these magnetic clutches are energised, the supporting rollers 5 and 6 are prevented from rotating, and they are thus held stationary during the finishing stage of the strip or workpiece.

The feed of the workpiece is effected by temporarily or intermittently interrupting the electrical circuit passing through the windings of the magnetic clutches 33.

For this purpose, a switch roller 34 (Fig. 6) is connected to the electrical circuit of these magnetic clutches 33, which switch roller 34 has a suitably shaped contact surface layer 35. The hatched surface 36 shown in Fig. 6 consists of a layer of electrically insulating material. Against this switch roller rests, as shown in Fig. 6, a fixed sliding contact 37, and an adjustable sliding contact 38 which is movable in the direction of the arrow B. The adjustable sliding contact 38 can be moved to the left or right from the middle position shown in Fig. 6 by means of a hand lever 39 (Figs. 1 and 2) acting through a toothed segment 40 (Fig. 6) and a slide 42 which is slidable on a rod 41 and carries the sliding contact 38.

The switch roller 34 is drivably connected with the drive of the cutting tool 8, the drive being taken from the shaft 14 (Fig. 1) and transmitted by means of a chain 43 to switch roller 34 by means of a sprocket 44 (Fig. 6).

It is clear from Fig. 6 that, when the sliding contact 38 is in its mid position, the electrical circuit containing the windings of the clutches 33 is closed so that the supporting rollers 5 and 6 are held stationary and consequently the finishing block then always operates upon the same part of the workpiece. When it is desired to advance the workpiece, the lever 39 is swung in one direction or the other whereupon, due to the electrical insulation 36 on the switch roller, the electrical circuit containing the windings of the electromagnetic clutches is temporarily interrupted with the result that the rollers 5, 6 are freed for rotation and the profiled strip is carried along by the finishing block 8.

Fig. 6 shows that the extent of the displacement of the contact 38 is proportional with the interruption of the electrical current. The stroke increases proportionally with the angular movement of the rocking lever 39. The rate of advance of the workpiece can thus be regulated continuously, as distinct from step by step, and with a high degree of accuracy from 0 up to a maximum displacement. The finishing block 8 can be made of moulded resin or other suitable material, such as for example cork. On this cutting block is secured by clips or the like a sheet of abrasive paper or cloth. Provided that the profiled strip has no sharp edges, it is possible to mount on the carrier 9 a supply roll 45 of abrasive cloth or paper, from which the said abrasive cloth or paper can be unwound, as illustrated in Fig. 2, and clamped to the block 8 or to the carrier 9.

The tool is, for example, mounted so that it is universally movable by means of a ball and socket mounting 46, so that it can be freely adjustable to suit the workpiece. The working pressure applied upon the workpiece is obtained through a spring 47 from a foot pedal 48. Coupled to this foot pedal is a rod 49 which operates via connecting pieces 50 and a supporting lever 51 to press down upon the cutting tool carrier 9 and the finishing tool 7 and apply thereto the required working pressure for the finishing operation. The resulting finishing pressure can be increased or reduced as required by adjusting the height of the slide 4. For purposes of other operations, for example in order to be able to apply gelatin or varnish to the profiled strips, a further drive is provided for the supporting rollers 5, 6, so that they can be made to advance or feed the workpiece supported by them continuously at a uniform speed. This drive is obtained from a sprocket 52 (Fig. 6) fixed on the spindle of the switching roller 34, which sprocket 52 drives a gear 54 (Fig. 1) by means of a chain drive 53. The gear 54 can be brought into mesh with one of the intermediate gears 32. In order to be able to carry out the finishing operations, it is possible to disengage this gear by sliding it in the direction of the arrow C (Fig. 1).

The invention is not limited to what is shown in the constructional embodiment described above and is also not limited solely to finishing profiled strips. The invention can in fact also be used for other surface treatment operations which involve a reciprocating movement of a tool. It is further possible to replace the supporting rollers 5 and 6 by two endless supporting bands which serve as the supporting bed.

While, in the construction according to Figs. 1–3, the workpiece is held to the supporting bed by friction, it is also possible, as shown in Fig. 9, to hold the profiled workpiece is held to the supporting bed by friction, it ing it between two laterally arranged press jaws 57 (Fig. 9) which are slidable in the direction of the arrows D. On temporarily releasing these press jaws 57, the workpiece 56 is carried along by the friction between it and the tool which is pressed against it, whereby the feed of the workpiece is achieved. In addition to the two laterally arranged press jaws 57, there may be provided an upper clamping jaw 58 which is preferably shaped to correspond to the desired profile of the workpiece, which jaw 58 is adjustable in the direction of the arrow E. When pressing down this clamping jaw on the workpiece 56 the latter is held fast on its sliding bed 59. In this case also, the advance of the workpiece takes place by means of the tool when the clamping jaw 58 is temporarily disengaged from the said workpiece.

In order to increase the intensity of the surface treatment, the tool may be given, in addition to its reciprocating movement, a superimposed short-stroke pivotal movement in its direction of advance, the frequency of the last-mentioned pivotal movement amounting to many times of that of the reciprocating movement. For this purpose, an electric motor may be arranged on the carrier 9 (Figs. 1 and 2) which imparts to the cutter block 8 a swinging movement of about 2 mm. stroke in the direction of the arrow A, the cutter block being arranged to carry out three thousand or more pivotal movements per minute, while the lever 17 reciprocates the finishing block only approximately 60 times per minute.

In order to prevent clogging of the finishing tool with wood dust, it is also possible to arrange for the wood dust to be removed by suction through the tool itself.

In Fig. 4 are shown suction bores 55 in the finishing block 8, which bores extend as far as the working surface thereof and serve for the removal of the wood dust by suction.

For this purpose i.e. to permit the removal of wood dust, suitable holes are also provided in the strips of abrasive paper or cloth, which are stretched over the finishing block. If desired, the suction bores 55 may also be so arranged that they not only suck up the wood dust, but also at the same time enable the strips of abrasive paper or cloth to be held by the suction against the finishing block.

In Figs. 10–12 is shown a further advantageous construction of the supporting bed of the profile finishing machine. This consists of supporting rollers 60 arranged one behind the other, two return rollers 61, 62 and an endless band 64 provided with transverse grooves 63 and made of an elastic material, such as, for example, rubber. For the purpose of temporarily holding the supporting bed constituted by the endless band 64, there is associated with the roller 61 an electromagnetic clutch 65. Each of these parts 60–65 inclusive has its counterpart on the opposite side of the middle plane of the machine which is indicated at *a* in Fig. 11.

The endless band 64 is provided with a guide rib 66 which engages in a corresponding guide groove 67 in the return rollers 61, 62 and in the supporting rollers 60. In order effectively to prevent sliding of the endless band 64 around the return rollers 61, these return rollers may be provided on their circumference with a coating 68 of a resilient material, such as, for example, india rubber.

In the constructional embodiment of the endless band 64 illustrated by way of example in Fig. 12, the said endless band, in addition to being provided with transverse grooves 63, is also provided with longitudinal grooves 69.

The transverse ribs 70 of the band are sub-divided in this manner so that very good surface adhesion is provided which effectively prevents displacement of a workpiece which is pressed down upon the band 64.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A machine for treating the surface of a workpiece; comprising a tool, means for imparting to said tool a reciprocating movement, supporting means for said workpiece and provided with a frictionally adherent supporting surface, said supporting surface being movable in the direction of movement of said tool, the frictional resistance of said supporting surface relative to the workpiece being greater than the frictional resistance of said tool relative to said workpiece, means for locking said supporting means in position during treatment of said workpiece surface, and workpiece feed controlling means operatively connected to said locking means for temporarily deactivating said locking means and releasing said supporting means for movement, thereby to permit said tool to displace said workpiece for feeding purposes along said surface of said supporting means.

2. A machine according to claim 1, said supporting means including a plurality of rotatable supporting rollers arranged next to each other and each provided with transversely ribbed covering means of resilient material for normally retaining said workpiece thereon, said locking means being operatively connected with said rollers and including means to normally arrest said rollers and subsequently to temporarily release said rollers whereby the latter may perform free rotation, so that in the course of further movement of said tool said workpiece is carried over said roller covering means by said tool for feeding purposes.

3. A machine according to claim 2, said supporting rollers being conically bevelled on their proximate ends.

4. A machine according to claim 1, said supporting means including a plurality of supporting rollers arranged one behind the other and each provided with a transversely ribbed covering of resilient material.

5. A machine according to claim 1, wherein said supporting means includes a plurality of supporting rollers arranged one behind the other, two return rollers, and an endless transversely ribbed band of resilient material trained over said return rollers.

6. A machine according to claim 5, wherein said return rollers are provided on their circumferences with a coating of resilient material.

7. A machine according to claim 5, wherein said endless band is provided with a guide rib, said return rollers as well as said supporting rollers being provided with guide grooves corresponding to said guide rib.

8. A machine according to claim 7, wherein said endless band has transverse ribs, said transverse ribs of the endless band being subdivided by longitudinal grooves.

9. A machine according to claim 1, said supporting means including two sets of rollers arranged one beside the other, and means for varying not only the lateral spacing between said latter rollers but also their angular relationship to each other.

10. A machine according to claim 9, said sets of rollers being arranged on a vertically adjustable slide, said slide having both end walls thereof provided with semi-circular guide slots, two bars extending longitudinally of the machine and adjustably mounted in said guide slots, supporting bars arranged transversely, and adjustably on said two bars, said sets of rollers being carried by said supporting bars.

11. A machine according to claim 1, said locking means including electromagnetic clutches for locking said supporting means, 12. A machine according to claim 11, including means for controlling said electromagnetic clutches, said latter means including a rotatable switch roller connected with said means for imparting movement to said tool, said switch roller having a covering of electrically conductive material extending over part of the outer surface thereof and an axially displaceable sliding contact arranged to bear against said switch roller, the arrangement being such that, in the middle position of said sliding contact the circuit of the electromagnetic clutch windings is closed and on displacement of this contact in one direction or the other said circuit is temporarily interrupted for a period corresponding to the extent of displacement of said sliding contact.

13. A machine according to claim 12, including drive means connected to said supporting means for advancing the latter at a uniform rate.

14. A workpiece surface treating machine; comprising a machine stand, supporting means for said workpiece carried by said stand and arranged for movement relative thereto, a tool disposed adjacent said supporting means, whereby said workpiece may be sandwiched between said tool and said supporting means, means for imparting to said tool a reciprocating movement, said supporting means being provided with a frictional, adherent supporting surface for said workpiece, the frictional resistance of said supporting surface relative to the workpiece being greater than the frictional resistance of said tool relative to the workpiece, means for retaining said supporting means in stationary position with the workpiece frictionally held in desired position relative to said supporting means, workpiece feed control means connected to said retaining means, and means for actuating said control means and temporarily deactivating said retaining means thereby to permit movement of said supporting means during movement of said tool on said workpiece surface while said tool displaces said workpiece along said supporting means.

15. A machine according to claim 14, said workpiece supporting means including a plurality of roller means arranged side by side and each provided with a peripheral friction producing gripping surface, means on said stand for adjusting the distance and angular relation between adjacent roller means, whereby said workpiece may be located in predetermined position to said tool, said retaining means including magnetic clutch means having windings, said feed control means including switch means operatively connected to said windings, said actuating means forming part of said switch means, whereby flow of electric current through said windings of said clutch means may be temporarily interrupted by said actuating means, thereby to free said roller means for rotational movement.

16. A machine according to claim 15, said actuating means including an adjustment lever, means interconnecting said adjustment lever with said switch means, said interconnecting means including shiftable contact means, said switch means being provided with a driven switch roller with contact and electrically insulated surface parts, shiftable contact means engaging said surface parts, respectively during operation of said actuating means.

17. A machine according to claim 14, said supporting means including spaced apart roller means, and belt means trained over said roller means and having an outer surface of elastic material and provided with transverse grooves for engaging said workpiece.

References Cited in the file of this patent
UNITED STATES PATENTS

| | | |
|---|---|---|
| 373,882 | Codling | Nov. 29, 1887 |
| 385,171 | Davids | June 26, 1888 |
| 413,786 | Miller | Oct. 29, 1889 |
| 1,408,851 | Weiss | Mar. 7, 1922 |
| 2,165,616 | Cox | July 11, 1939 |
| 2,269,197 | Hamilton | Jan. 6, 1942 |
| 2,621,445 | Wallace | Dec. 16, 1952 |